US012629311B2

(12) United States Patent
Zhou

(10) Patent No.: US 12,629,311 B2
(45) Date of Patent: May 19, 2026

(54) MASSAGE MACHINE CORE

(71) Applicant: Xiamen Emoka Health Science & Technology Co., Ltd., Xiamen (CN)

(72) Inventor: Guanghua Zhou, Xiamen (CN)

(73) Assignee: Xiamen Emoka Health Science & Technology Co., Ltd., Xiamen (CN)

( * ) Notice: Subject to any disclaimer, the term of this patent is extended or adjusted under 35 U.S.C. 154(b) by 499 days.

(21) Appl. No.: 18/461,293

(22) Filed: Sep. 5, 2023

(65) Prior Publication Data

US 2023/0404842 A1 Dec. 21, 2023

(30) Foreign Application Priority Data

Aug. 14, 2023 (CN) ......................... 202322180717.6

(51) Int. Cl.
*A61H 7/00* (2006.01)
*A61H 15/00* (2006.01)

(52) U.S. Cl.
CPC ............... *A61H 7/007* (2013.01); *A61H 7/00* (2013.01); *A61H 15/0078* (2013.01); *A61H 2201/1215* (2013.01); *A61H 2201/14* (2013.01); *A61H 2205/062* (2013.01); *A61H 2205/081* (2013.01)

(58) Field of Classification Search
None
See application file for complete search history.

(56) References Cited

FOREIGN PATENT DOCUMENTS

| | | | |
|---|---|---|---|
| CN | 106726392 | A | 5/2017 |
| CN | 211067872 | U | 7/2020 |

*Primary Examiner* — Levon J Shahinian

(57) ABSTRACT

The present disclosure discloses a massage machine core, including: a housing, a battery, a brushless motor, a circuit board, a gear transmission group, a long rotating shaft, eccentric wheels, eccentric connecting rods, yaw wheels, yaw wheel covers, ejector rods, rocker arms and massaging assemblies; the yaw wheel cover is disposed on the long rotating shaft outside the rocker arm, the ejector rod is disposed between the eccentric connecting rod and the rocker arm, a bottom end of the ejector rod is pivotally connected with the eccentric connecting rod and the rocker arm, respectively; the present disclosure can realize 3D massage, and the massage effect is good.

10 Claims, 7 Drawing Sheets

MASSAGE MACHINE CORE

CROSS-REFERENCE TO RELATED APPLICATIONS

This application claims the benefit of priority from Chinese Patent Application No. 202322180717.6, filed on Aug. 14, 2023. The content of the aforementioned application, including any intervening amendments thereto, is incorporated herein by reference in its entirety.

TECHNICAL FIELD

The present disclosure relates to the technical field of massaging massagers, and in particular to a massage machine core of a massager.

BACKGROUND

In modern social life, people work for a long time in the office, study for a long time in the classroom, and play with computers and mobile phones for a long time in the dormitory or at home, which inevitably causes many people to suffer from cervical spondylosis and scapulohumeral periarthritis day after day. Shoulder belt massagers for shoulder and neck massage came into being. The shoulder belt massager is mainly used to massage the shoulder and neck positions of users. When in use, mechanical kinetic energy is provided for a massage assembly through a driving device, so that the massage assembly can relax muscles and activate collaterals of users by regular rotation, swing, vibration and beating, improve blood circulation of shoulders and neck, and relieve symptoms such as rigidity and pain of shoulder and neck muscles. The existing shoulder and neck massager with a kneading function is usually provided with a finger massage assembly and a kneading massage assembly for realizing finger massage and kneading massage, and the finger massage assembly and kneading massage assembly are respectively driven by corresponding driving mechanisms, so that the overall volume of the massager is larger, the production cost is also improved, and the market competitiveness is not strong. Furthermore, most of the existing shoulder and neck massagers only have 2D massage effect, that is, the massage head can only move up and down or left and right when massaging, which has poor massage effect and reduces consumer experience.

In view of the above, the present designers have developed the present disclosure by intensively conceiving the disadvantages and inconveniences caused by the unperfect design of the conventional massage machine core, and actively researching and improving trials.

SUMMARY

The disclosure aims at overcoming the shortcomings of the prior art and providing a massage machine core with the effects of opening back and clamping shoulders.

In order to achieve the above objective, the solution of the present disclosure is:

- a massage machine core includes: a housing, a battery, a brushless motor, a circuit board, a gear transmission group, a long rotating shaft, eccentric wheels, eccentric connecting rods, yaw wheels, yaw wheel covers, ejector rods, rocker arms and massaging assemblies; wherein the battery, the brushless motor, the gear transmission group, and the long shaft are disposed within the housing, the battery is connected with the circuit board, the brushless motor is connected with the circuit board, the gear transmission group is connected with an output shaft of the brushless motor, the gear transmission group is connected in the middle of the long rotating shaft, the two eccentric wheels are eccentrically fixed on both sides of the long rotating shaft corresponding to the gear transmission group, one end of the eccentric wheel toward the eccentric connecting rod forms an eccentric slope, the two eccentric connecting rods are correspondingly disposed on the long rotating shaft outside the two eccentric wheels, the eccentric connecting rod is provided with an eccentric connecting rod hole and a swing rod, the eccentric slope of the eccentric wheel is sleeved inside the eccentric connecting rod hole, the two yaw wheels are disposed on the long rotating shaft outside the two eccentric connecting rods, the yaw wheel has a first yaw shaft toward the eccentric connecting rod hole and a second yaw shaft disposed toward the other end, the first yaw shaft is sleeved inside the eccentric connecting rod hole of the eccentric connecting rod, bottom ends of the two rocker arms are disposed on the second yaw shafts of the two yaw wheels, top ends of the two rocker arms are provided with massage head seats, the massage assemblies are arranged on the massage head seats, the two yaw wheel covers are arranged on the long rotating shaft outside the two rocker arms, the ejector rod is arranged between the eccentric connecting rod and the rocker arm, a bottom end of the ejector rod is respectively pivoted with the eccentric connecting rod and the rocker arm, and a top end of the ejector rod is inclined relative to the long rotating shaft.

Further, each of two sides of a top end of the rocker arm is provided with a massage head seat, and the two massage head seats are staggered up and down; the massage head assembly includes a first massage head and a second massage head, and the first massage head and the second massage head are respectively arranged on both sides of the rocker arm.

Further, the gear transmission group includes a double gear having a helical gear and a spur gear and a driven gear fixed on the long rotating shaft, the helical gear and the spur gear of the double gear are fixed together through a gear rotating shaft, the gear transmission group is mounted on a gear box, the gear rotating shaft is parallel with the long rotating shaft, two ends of the gear rotating shaft are disposed on the gear box; the brushless motor is provided with a worm, the worm is perpendicular to the long rotating shaft and is arranged below the long rotating shaft, one end of the worm is connected with the brushless motor, the other end is sleeved with a fixing sleeve, and the fixing sleeve is fixed on the gear box.

Further, a yaw connecting plate is arranged between the first yaw shaft and the second yaw shaft of the yaw wheel, the first yaw shaft and the second yaw shaft are staggered relative to the yaw connecting plate, the second yaw shaft is eccentric relative to the yaw connecting plate, the first yaw shaft and the yaw connecting plate are concentric, the yaw wheel is provided with a shaft hole for the long rotating shaft to pass through, and the shaft hole is eccentric relative to the first yaw shaft, the second yaw shaft and the yaw connecting plate.

Further, a lower part of the ejector rod is provided with a first shaft hole and a second shaft hole arranged at an interval up and down, the bottom of one side of the rocker arm corresponding to the ejector rod is provided with a third shaft hole corresponding to the first shaft hole of the ejector rod, the first shaft hole and the third shaft hole are rotationally fixed together through a sub-buckle and a female buckle, the swing rod of the eccentric connecting rod is provided with a fourth shaft hole corresponding to the second shaft hole, and the second shaft hole and the fourth shaft hole are rotationally fixed together through a sub-buckle and a female buckle.

Further, the rocker arm is provided with a through hole corresponding to the second yaw shaft of the yaw wheel, the through hole sleeves the second yaw shaft, a bottom of the rocker arm is provided with a limiting column, and the housing is provided with a limiting groove for the movement of the limiting column.

Further, the yaw wheel cover is provided with a wheel cover slope corresponding to the eccentric slope of the eccentric wheel, and the eccentric slope of the eccentric wheel and the wheel cover slope of the yaw wheel cover are arranged in opposite directions.

Further, the eccentric wheel, the yaw wheel and the yaw wheel cover are fixed together, one side of the eccentric wheel facing the yaw wheel cover is provided with a fixed column protruding out of the eccentric slope, the first yaw shaft of the yaw wheel is provided with a fixed groove corresponding to the fixed column, the fixed column and the yaw wheel cover are provided with screw columns corresponding to each other, and the fixed groove of the yaw wheel sleeves the fixed column of the eccentric wheel.

Further, the eccentric connecting rod hole of the eccentric connecting rod and the through hole of the rocker arm are respectively provided with a plurality of oil storage grooves.

Further, the eccentric wheel is provided with a pin groove, the long rotating shaft is provided with a pin hole, and a fixing pin is inserted into the pin hole from the pin groove of the eccentric wheel to fix the eccentric wheel and the long rotating shaft together.

With the above structure, in operation of the massage machine core of the present disclosure, the battery supplies power to the circuit board, the circuit board controls the brushless motor to operate, and when the brushless motor rotates, the gear transmission group and the long rotating shaft connected with the gear transmission group are driven to rotate synchronously, and the long rotating shaft drives the eccentric wheel and the yaw wheel to rotate and thus drives the ejector rod to rotate. Because the eccentric wheel is eccentrically arranged and has an eccentric slope, the ejector rod is pivoted on the eccentric connecting rod and the rocker arm, the eccentric wheel can drive the ejector rod and the rocker arm to move up and down under the eccentric action when the long rotating shaft rotates, and the rocker arm and the ejector rod can move left and right under the action of the eccentric slope, so that the ejector rod can carry out an "八"-shaped movement track and has a massage effect of opening the back, and the ejector rod and the massage assembly can cooperate to realize the massage effect of clamping shoulders. Compared with the existing 2D massage, the disclosure can realize 3D massage and has better massage effect. The overall structure of the disclosure is more compact, the manufacturing cost is lower, and the market competitiveness can be improved.

Figure 1:
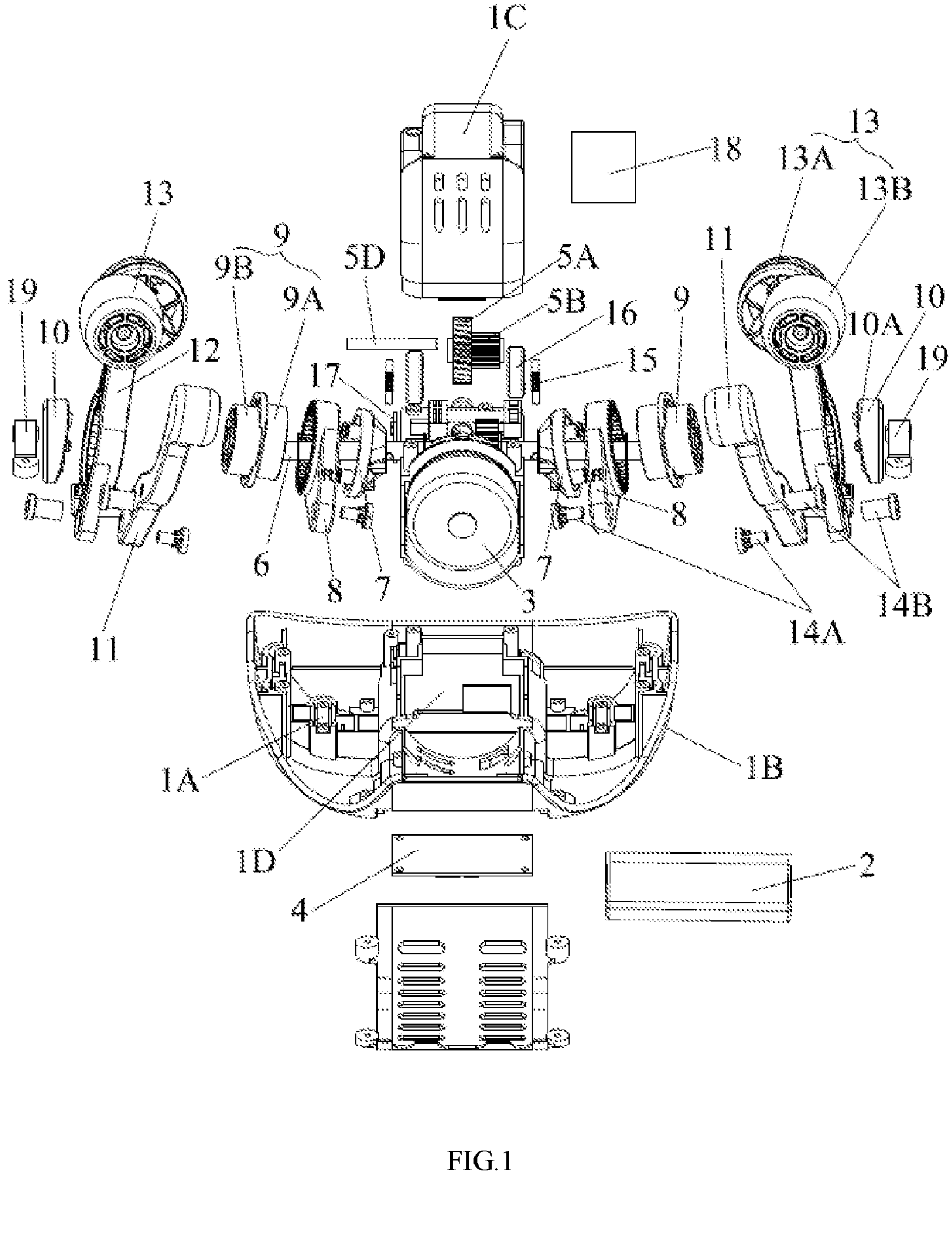
FIG. 1 is an exploded view of the structure of the present disclosure.
Figure 2:
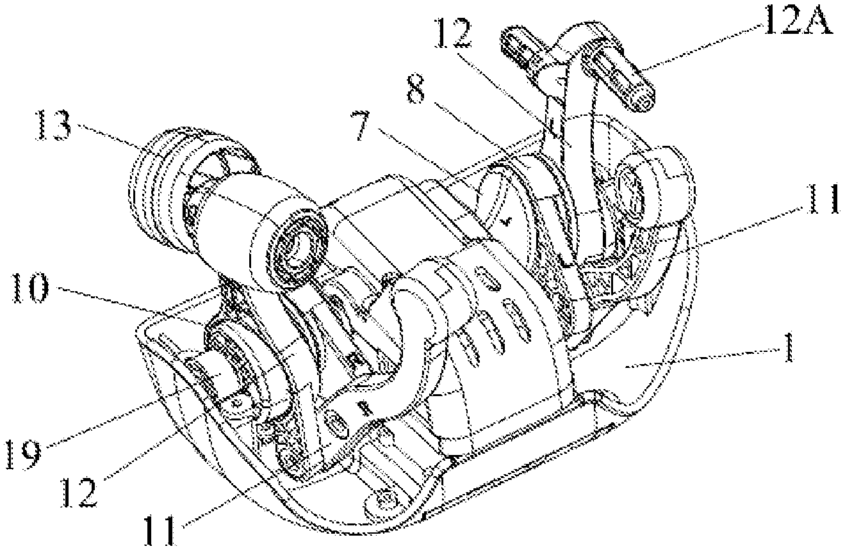
FIG. 2 is a combined schematic diagram of the present disclosure.

DESCRIPTION OF REFERENCE NUMERALS housing 1, limiting groove 1A, lower housing 1B, upper cover 1C, chamber 1D;

battery 2, brushless motor 3, worm 3A, fixing sleeve 3B, circuit board 4;

gear transmission group 5, helical gear 5A, spur gear 5B, driven gear 5C, gear rotating shaft 5D, gear box 5E;

long rotating shaft 6, pin hole 6A; eccentric wheel 7, eccentric slope 7A, fixed column 7B, pin groove 7C;

eccentric connecting rod 8, eccentric connecting rod hole 8A, swing rod 8B, fourth shaft hole 8C, oil storage groove 8D;

yaw wheel 9, first yaw shaft 9A, second yaw shaft 9B, yaw connecting plate 9C, shaft hole 9D, fixing groove 9E;

yaw wheel cover 10, wheel cover slope 10A, ejector rod 11, first shaft hole 11A, second shaft hole 11B;

rocker arm 12, massage seat 12A, third shaft hole 12B, through hole 12C, limiting column 12D, oil storage groove 12E;

massage assembly 13, first massage head 13A, second massage head 13B;

sub-buckle 14A, female buckle 14B;

fixing pin 15, bearing 16, Hall plate 17, heating sheet 18, fixing ring 19.

DETAILED DESCRIPTION

In order to further explain the technical solutions of the present disclosure, the present disclosure is described in detail below by specific embodiments.

In the description of the disclosure, it needs to be understood that, the terms "central", "longitudinal", "lateral", "upper", "lower", "front", "rear", "left", "right", "vertical", "horizontal", "top", "bottom", "inner", "outer" and the like indicate an orientation or positional relationship based on that shown in the drawings, only for ease of description of the disclosure and for simplicity of description, and are not intended to indicate or imply that the device or element referred to must have a particular orientation, be constructed and operate in a particular orientation, and therefore should not be construed as limiting the disclosure. In the description of the present disclosure, unless otherwise specified, the meaning of "plurality" is two or more.

As shown in FIGS. 1 to 5, the present disclosure discloses a massage machine core, which includes a housing 1, a battery 2, a brushless motor 3, a circuit board 4, a gear transmission group 5, a long rotating shaft 6, eccentric wheels 7, eccentric connecting rods 8, yaw wheels 9, yaw wheel covers 10, ejector rods 10, rocker arms 11 and massaging assemblies 12.

The battery 2, the brushless motor 3, the gear transmission group 5, and the long shaft 6 are disposed within the housing 1, the battery 2 is connected with the circuit board 4, the brushless motor 3 is connected with the circuit board 4, the gear transmission group 5 is connected with an output shaft of the brushless motor 3, the gear transmission group 5 is connected in the middle of the long rotating shaft 6, the two eccentric wheels 7 are eccentrically fixed on both sides of the long rotating shaft 6 corresponding to the gear transmission group 5, one end of the eccentric wheel 7 toward the eccentric connecting rod 8 forms an eccentric slope 7A, the two eccentric connecting rods 8 are correspondingly disposed on the long rotating shaft 6 outside the two eccentric wheels 7, the eccentric connecting rod 8 is provided with an eccentric connecting rod hole 8A and a swing rod 8B, the eccentric slope 7A of the eccentric wheel 7 is sleeved inside the eccentric connecting rod hole 8A, the two yaw wheels 9 are disposed on the long rotating shaft 6 outside the two eccentric connecting rods 8, the yaw wheel 9 has a first yaw shaft 9A toward the eccentric connecting rod hole 8A and a second yaw shaft 9B disposed toward the other end, the first yaw shaft 9A is sleeved inside the eccentric connecting rod hole 8A of the eccentric connecting rod 8, one end of each of the two rocker arms 12 is disposed on the second yaw shaft 9B of each of the two yaw wheels 9, the other end of each of the two rocker arms 12 is provided with a massage head seat 12A, the two massage assemblies 13 are correspondingly arranged on the massage head seats 12A of the two rocker arms, the two yaw wheel covers 10 are arranged on the long rotating shaft 6 outside the two rocker arms 12, the ejector rod is arranged between the swing rod 8B of the eccentric connecting rod 8 and the rocker arm 12, a bottom end of the ejector rod 11 is respectively pivoted with the eccentric connecting rod 8 and the rocker arm 12, and a top end of the ejector rod 11 is inclined relative to the long rotating shaft 6.

In the massage machine core of the present disclosure, the battery 2 supplies power to the circuit board 4, the circuit board 4 controls the operation of the brushless motor 3, when the brushless motor 3 rotates, the gear transmission group 5 and the long rotating shaft 6 connected with the gear transmission group 5 are driven to rotate synchronously, and the long rotating shaft 6 drives the eccentric wheel 7 and the yaw wheel 8 to rotate and thus drives the ejector rod to rotate. Because the eccentric wheel 7 is arranged eccentrically and has an eccentric slope 7A, the ejector rod 11 is pivoted on the eccentric connecting rod 8 and the rocker arm 12, the eccentric wheel 7 will drive the ejector rod 11 and the rocker arm 12 to move up and down under the eccentric action when the long rotating shaft 6 rotates, and the rocker arm 12 and the ejector rod 11 can move left and right under the action of the eccentric slope 7A, so that the ejector rod 11 can carry out an "八"-shaped movement track and has a massage effect of opening the back. The ejector rod 11 can cooperate with the massage assembly 13 to realize the massage effect of clamping shoulders. Compared with the existing 2D massage, the disclosure can realize 3D massage and has better massage effect.

In the present embodiment, each of two sides of a top end of the rocker arm 12 is provided with a massage head seat 12A, and the two massage head seats 12A are staggered up and down; the massage head assembly 13 includes a first massage head 13A and a second massage head 13B, and the first massage head 13A and the second massage head 13B are respectively arranged on both sides of the rocker arm 12. The first massage head 13A and the second massage head 13B are staggered on both sides of the top end of the rocker arm 12, so that when the massage machine core moves, the massage assembly 13 can realize the neck clamping function, and the shoulder clamping action can be better carried out by cooperating with the ejector rod 11.

Figure 6:
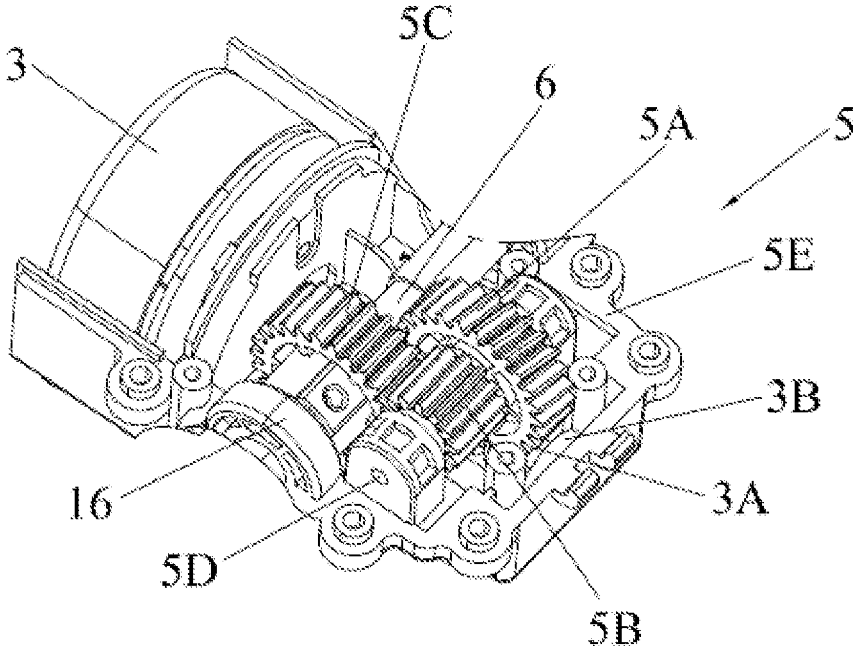
FIG. 6 is a schematic diagram of a gear structure of the present disclosure.

As shown in FIG. 6, the gear transmission group 5 includes a double gear having a helical gear 5A and a spur gear 5B and a driven gear 5C fixed on the long rotating shaft 6, the helical gear 5A and the spur gear 5B of the double gear are fixed together through a gear rotating shaft 5D, the gear transmission group 5 is mounted on a gear box 5E, the gear rotating shaft 5D is parallel with the long rotating shaft 6, two ends of the gear rotating shaft 5D are disposed on the gear box 5E; the brushless motor 3 is provided with a worm 3A, the worm 3A is perpendicular to the long rotating shaft 6 and is arranged below the long rotating shaft 6, one end of the worm 3A is connected with the brushless motor 3, the other end is sleeved with a fixing sleeve 3B, and the fixing sleeve 3B is fixed on the gear box 5E; the helical gear 5A of the double gear meshes with the worm 3A and the spur gear 5B meshes with the driven gear 5C. When the brushless motor 3 operates, the worm 3A rotates to decelerate the helical gear 5A and the spur gear 5B engaged with the worm 3A, and then the torque force is added to rotate the driven gear 5C and the long rotating shaft 6 fixed to the driven gear 5C. The gear box 5E is detachably mounted on the housing 1.

Figure 7:
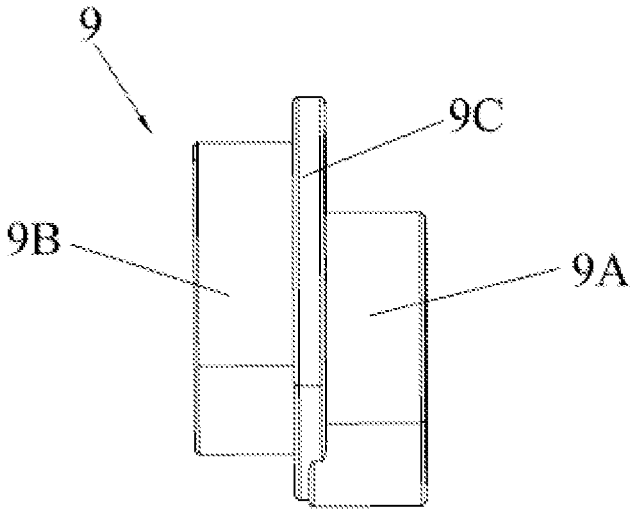
FIG. 7 is a side schematic diagram of a yaw wheel of the present disclosure.

As shown in FIG. 7, a yaw connecting plate 9C is arranged between the first yaw shaft 9A and the second yaw shaft 9B of the yaw wheel 9, the first yaw shaft 9A and the second yaw shaft 9B are staggered relative to the yaw connecting plate 9C, the second yaw shaft 9B is eccentric relative to the yaw connecting plate 9C, the first yaw shaft 9A and the yaw connecting plate 9C are concentric, the yaw wheel 9 is provided with a shaft hole 9D for the long rotating shaft 6 to pass through, and the shaft hole 9D is eccentric relative to the first yaw shaft 9A, the second yaw shaft 9B and the yaw connecting plate 9C.

Figure 3:
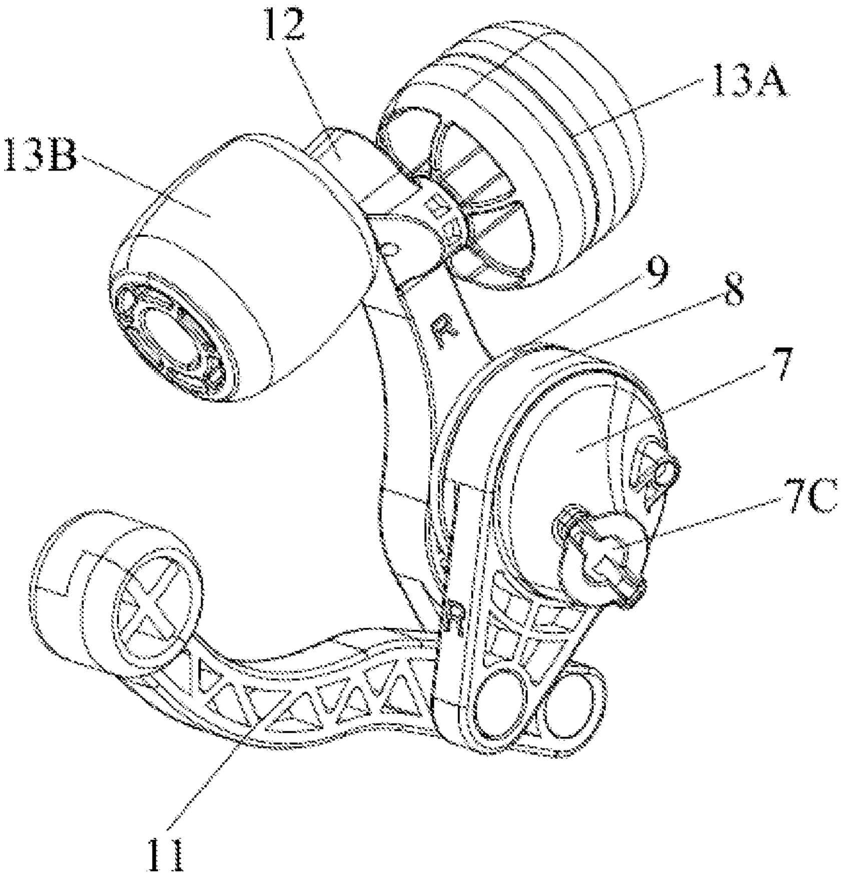
FIG. 3 is a combined diagram of a main massage structure of the present disclosure.
Figure 4:
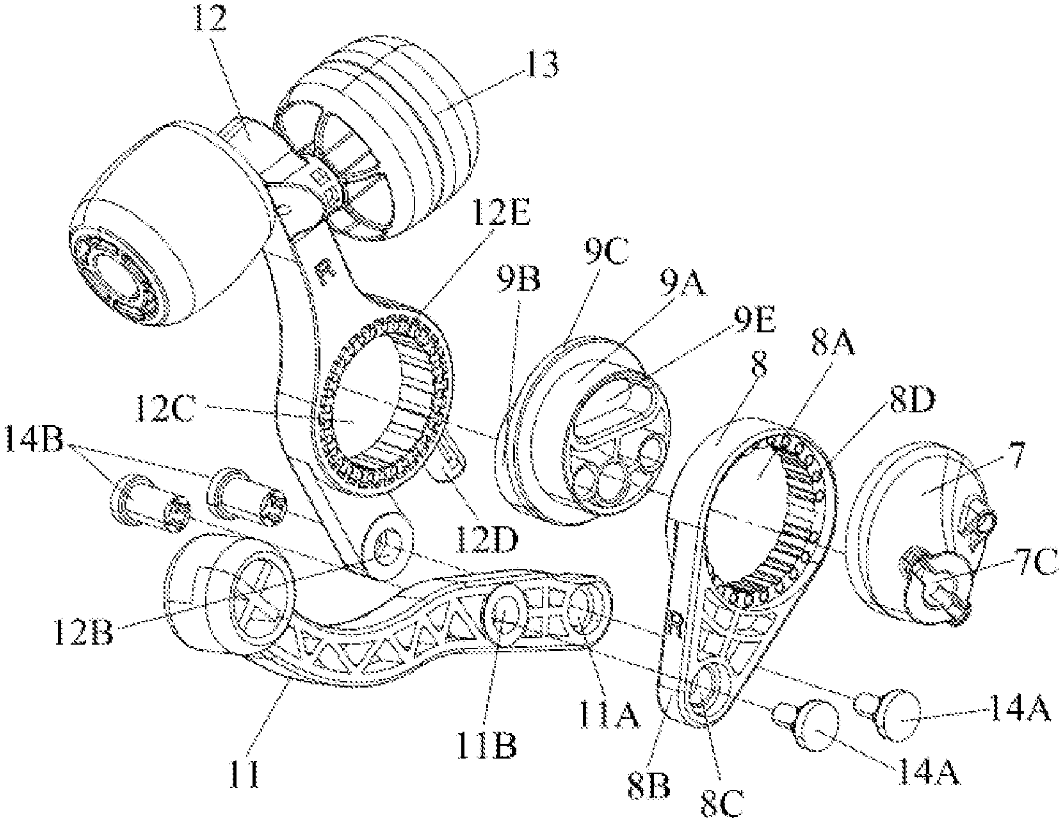
FIG. 4 is an exploded view of the main massage structure of the present disclosure.
Figure 5:
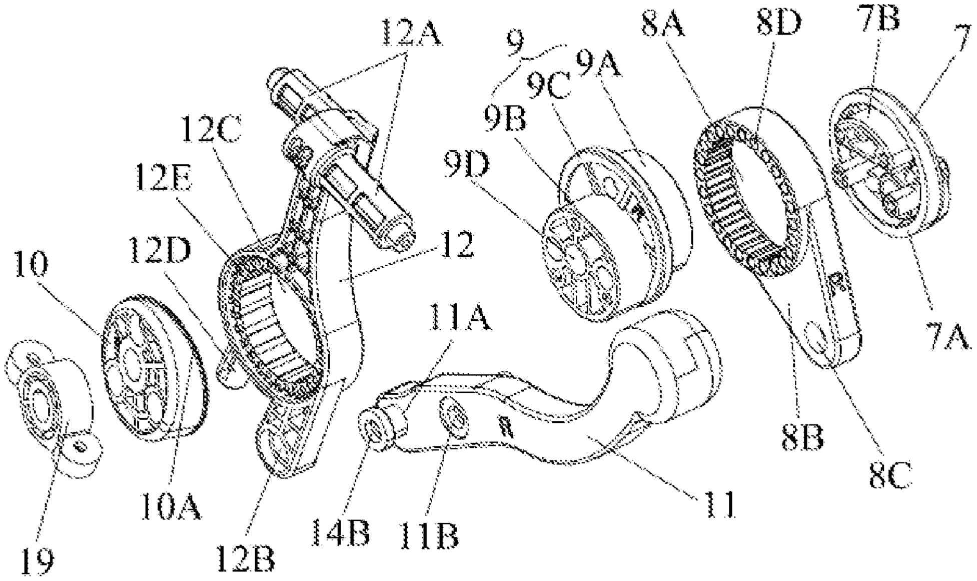
FIG. 5 is an exploded view of the main massage structure of the present disclosure in another direction.

As shown in FIGS. 3-5, a lower part of the ejector rod 11 is provided with a first shaft hole 11A and a second shaft hole 11B arranged at an interval up and down, the bottom of one side of the rocker arm 12 corresponding to the ejector rod 11 is provided with a third shaft hole 12B corresponding to the first shaft hole 11A of the ejector rod 11, the first shaft hole 11A and the third shaft hole 12B are rotationally fixed together through a sub-buckle 14A and a female buckle 14B, the swing rod 8B of the eccentric connecting rod 8 is provided with a fourth shaft hole 8C corresponding to the second shaft hole 11B, and the second shaft hole 11B and the fourth shaft hole 8C are rotationally fixed together through a sub-buckle 14A and a female buckle 14B.

In the present embodiment, the rocker arm 12 is provided with a through hole 12C corresponding to the second yaw shaft 9B of the yaw wheel 9, the through hole 12C sleeves the second yaw shaft 9B, a bottom of the rocker arm 12 is provided with a limiting column 12D, and the housing 1 is provided with a limiting groove 1A for the movement of the limiting column 12D. The limiting groove 1A can be directly formed on the housing 1, or can be detachably installed on the housing 1.

As shown in FIG. 1, the yaw wheel cover 10 is provided with a wheel cover slope corresponding to the eccentric slope 7A of the eccentric wheel 7, and in assembly, the eccentric slope 7A of the eccentric wheel 7 and the wheel cover slope 10A of the yaw wheel cover 10 are arranged in opposite directions.

The eccentric wheel 7, the yaw wheel 9 and the yaw wheel cover 10 are fixed together, one side of the eccentric wheel 7 facing the yaw wheel cover 10 is provided with a fixed column 7B protruding out of the eccentric slope 7A, the first yaw shaft 9A of the yaw wheel 9 is provided with a fixed groove 9E corresponding to the fixed column 7B, the fixed column 7B and the yaw wheel cover 10 are provided with screw columns corresponding to each other, and the fixed groove 9E of the yaw wheel 9 sleeves the fixed column 7B of the eccentric wheel 7. After the eccentric wheel 7, the eccentric connecting rod 8, the yaw wheel 9, the rocker arm 12, the ejector rod 11 and the yaw wheel cover 10 are installed, a screw passes through a screw post of the yaw wheel cover and screw poses of the yaw wheel 9 and the eccentric wheel 7 in turn from the outside of the yaw wheel cover 10 to lock the yaw wheel cover 10, the yaw wheel 9 and the eccentric wheel 7 together.

As shown in FIGS. 4-5, the eccentric connecting rod hole 8A of the eccentric connecting rod 8 and the through hole 12C of the rocker arm 12 are respectively provided with a plurality of oil storage grooves 8D, 12E. When the oil storage grooves 8D, 12E are filled with the lubricant, oil film contact among the eccentric wheel 7, the eccentric connecting rod 8, the yaw wheel 9, the yaw wheel cover 10, and the rocker arm 12 can be made during the operation of the massage machine core of the present disclosure, thereby reducing frictional resistance and power loss, and also reducing wear between the lubricated components, and improving the service lives of the components.

In the present embodiment, the eccentric wheel 7 is provided with a pin groove 7C, the long rotating shaft 6 is provided with a pin hole 6A, and a fixing pin 15 is inserted into the pin hole 6A from the pin groove 7C of the eccentric wheel 7 to fix the eccentric wheel 7 and the long rotating shaft 6 together.

In the present embodiment, the long rotating shaft 6 is further provided with bearings 16 on both sides of the driven gear 5C, the bearing 16 being provided between the eccentric wheel 7 and the driven gear 5C, wherein a Hall plate 15 is further provided between one eccentric wheel 7 and the bearing 16.

The massage machine core of the present disclosure is further provided with a heating sheet 18, the heating sheet 18 is connected with the circuit board 4, a temperature control sensor is built in the heating sheet 18, and the heating sheet 16 is disposed on an inner top surface of the housing 1.

In the present embodiment, the housing 1 includes a lower housing 1B and an upper cover 1C, the center of the lower housing 1B is provided with a chamber 1D for mounting the gear box 5E and the brushless motor 3, The upper cover 1C covers the chamber 1D, and the heating sheet 18 is fixed in the upper cover 1C.

In the present embodiment, the long rotating shaft 6 is further provided with fixing rings 19 at both ends thereof.

The above embodiments and drawings are not intended to limit the form and pattern of a product of the disclosure, and any appropriate changes or modifications made thereto by those skilled in the art should be regarded as not departing from the patent scope of the present disclosure.

What is claimed is:

1. A massage machine core, comprising: a housing, a battery, a brushless motor, a circuit board, a gear transmission group, a long rotating shaft, eccentric wheels, eccentric connecting rods, yaw wheels, yaw wheel covers, ejector rods, rocker arms and massaging assemblies; wherein the battery, the brushless motor, the gear transmission group, and the long shaft are disposed within the housing, the battery is connected with the circuit board, the brushless motor is connected with the circuit board, the gear transmission group is connected with an output shaft of the brushless motor, the gear transmission group is connected in the middle of the long rotating shaft, the two eccentric wheels are eccentrically fixed on both sides of the long rotating shaft corresponding to the gear transmission group, one end of the eccentric wheel toward the eccentric connecting rod forms an eccentric slope, the two eccentric connecting rods are correspondingly disposed on the long rotating shaft outside the two eccentric wheels, the eccentric connecting rod is provided with an eccentric connecting rod hole and a swing rod, the eccentric slope of the eccentric wheel is sleeved inside the eccentric connecting rod hole, the two yaw wheels are disposed on the long rotating shaft outside the two eccentric connecting rods, the yaw wheel has a first yaw shaft toward the eccentric connecting rod hole and a second yaw shaft disposed toward the other end, the first yaw shaft is sleeved inside the eccentric connecting rod hole of the eccentric connecting rod, bottom ends of the two rocker arms are disposed on the second yaw shafts of the two yaw wheels, top ends of the two rocker arms are provided with massage head seats, the massage assemblies are arranged on the massage head seats, the two yaw wheel covers are arranged on the long rotating shaft outside the two rocker arms, the ejector rod is arranged between the eccentric connecting rod and the rocker arm, a bottom end of the ejector rod is respectively pivoted with the eccentric connecting rod and the rocker arm, and a top end of the ejector rod is inclined relative to the long rotating shaft.

2. The massage machine core according to claim 1, wherein each of two sides of a top end of the rocker arm is provided with a massage head seat, and the two massage head seats are staggered up and down; the massage head assembly comprises a first massage head and a second massage head, and the first massage head and the second massage head are respectively arranged on both sides of the rocker arm.

3. The massage machine core according to claim 1, wherein the gear transmission group comprises a double gear having a helical gear and a spur gear and a driven gear fixed on the long rotating shaft, the helical gear and the spur gear of the double gear are fixed together through a gear rotating shaft, the gear transmission group is mounted on a gear box, the gear rotating shaft is parallel with the long rotating shaft, two ends of the gear rotating shaft are disposed on the gear box; the brushless motor is provided with a worm, the worm is perpendicular to the long rotating shaft and is arranged below the long rotating shaft, one end of the worm is connected with the brushless motor, the other end is sleeved with a fixing sleeve, and the fixing sleeve is fixed on the gear box.

4. The massage machine core according to claim 1, wherein a yaw connecting plate is arranged between the first yaw shaft and the second yaw shaft of the yaw wheel, the first yaw shaft and the second yaw shaft are staggered relative to the yaw connecting plate, the second yaw shaft is eccentric relative to the yaw connecting plate, the first yaw shaft and the yaw connecting plate are concentric, the yaw wheel is provided with a shaft hole for the long rotating shaft to pass through, and the shaft hole is eccentric relative to the first yaw shaft, the second yaw shaft and the yaw connecting plate.

5. The massage machine core according to claim 1, wherein a lower part of the ejector rod is provided with a first shaft hole and a second shaft hole arranged at an interval up and down, the bottom of one side of the rocker arm corresponding to the ejector rod is provided with a third shaft hole corresponding to the first shaft hole of the ejector rod, the first shaft hole and the third shaft hole are rotationally fixed together through a sub-buckle and a female buckle, the swing rod of the eccentric connecting rod is provided with a fourth shaft hole corresponding to the second shaft hole, and the second shaft hole and the fourth shaft hole are rotationally fixed together through a sub-buckle and a female buckle.

6. The massage machine core according to claim 1, wherein the rocker arm is provided with a through hole corresponding to the second yaw shaft of the yaw wheel, the through hole sleeves the second yaw shaft, a bottom of the rocker arm is provided with a limiting column, and the housing is provided with a limiting groove for the movement of the limiting column.

7. The massage machine core according to claim 1, wherein the yaw wheel cover is provided with a wheel cover slope corresponding to the eccentric slope of the eccentric wheel, and the eccentric slope of the eccentric wheel and the wheel cover slope of the yaw wheel cover are arranged in opposite directions.

8. The massage machine core according to claim 1, wherein the eccentric wheel, the yaw wheel and the yaw wheel cover are fixed together, one side of the eccentric wheel facing the yaw wheel cover is provided with a fixed column protruding out of the eccentric slope, the first yaw shaft of the yaw wheel is provided with a fixed groove corresponding to the fixed column, the fixed column and the yaw wheel cover are provided with screw columns corresponding to each other, and the fixed groove of the yaw wheel sleeves the fixed column of the eccentric wheel.

9. The massage machine core according to claim 1, wherein the eccentric connecting rod hole of the eccentric connecting rod and the through hole of the rocker arm are respectively provided with a plurality of oil storage grooves.

10. The massage machine core according to claim 1, wherein the eccentric wheel is provided with a pin groove, the long rotating shaft is provided with a pin hole, and a fixing pin is inserted into the pin hole from the pin groove of the eccentric wheel to fix the eccentric wheel and the long rotating shaft together.

* * * * *